(12) United States Patent  (10) Patent No.: US 8,504,581 B2
Bhattacharya et al.  (45) Date of Patent: Aug. 6, 2013

(54) MULTIPLE CRITERIA DECISION ANALYSIS

(75) Inventors: Arnab Bhattacharya, Kanpur (IN); Palvali Teja B, Hyderabad (IN)

(73) Assignee: Indian Institute of Technology Kanpur, Kanpur, Uttar Pradesh (IN)

( * ) Notice: Subject to any disclaimer, the term of this patent is extended or adjusted under 35 U.S.C. 154(b) by 94 days.

(21) Appl. No.: 13/072,916

(22) Filed: Mar. 28, 2011

(65) Prior Publication Data

US 2012/0254241 A1   Oct. 4, 2012

(51) Int. Cl.
*G06F 7/00*   (2006.01)
*G06F 17/30*   (2006.01)

(52) U.S. Cl.
CPC .. *G06F 7/00* (2013.01); *G06F 17/30* (2013.01)
USPC ............................. 707/758; 707/769; 707/776

(58) Field of Classification Search
None
See application file for complete search history.

(56) References Cited

U.S. PATENT DOCUMENTS 7,299,220 B2   11/2007   Chaudhuri et al.
7,707,207 B2   4/2010    Shriraghav et al.

OTHER PUBLICATIONS

S. Dar and R. Agrawal. Extending SQL with generalized transitive closure. IEEE Transactions on Knowledge and Data Engineering, 5(5):799-812, 1993.*
Llaria Bartolini, Paolo Ciaccia, and Marco Patella, Salsa: Computing the Skyline without Scanning the Whole Sky, CIKM 2006, Nov. 5-11, 2006, p. 405-414.
Stephan Borzsonyi, Donald Kossmann, and Konrad Stocker, The Skyline Operator, 2001, p. 421-430, In ICDE, IEEE.
Surajit Chaudhuri, Nilesh Dalvi, and Raghav Kaushik, Robust Cardinality and Cost Estimation for Skyline Operator, 2006, In 22nd ICDE p. 26, IEEE.
Jan Chomicki, Parke Godfrey, Jarek Gryz, and Dongming Liang, Skyline with Presorting, Mar. 2003, In ICDE p. 717-719.
Ronald Fagin, Amnon Lotem, and Moni Naor, Optimal Aggregation Algorithms for Middleware, 2001, In PODS p. 102-113.
Parke Godfrey, Ryan Shipley, and Jarek Gryz, Maximal Vector Computation in Large Data Sets, 2005, In 31 st VLDB p. 229-240, Trondheim, Norway.
Jonathan Goldstein and Raghu Ramakrishnan, Processing Queries by Linear Constraints, 1997, In PODS p. 257-267.
Jianmei Huang, Dabin Ding, Guoren Wang, and Junchang Xin, Tuning the Cardinality of Skyline, 2008, APWeb 2008 Workshops, LNCS 4977, p. 220-231.
Wen Jin, Martin Ester, Zengjian Hu, and Jiawei Han, The Multi-Relational Skyline Operator, 2007, In ICDE p. 1276-1280.
Donald Kossmann, Frank Ramsak, and Steffen Rost, Shooting Stars in the Sky: An Online Algorithm for Skyline Queries, 2002, In 28th VLDB p. 275-286, Hong Kong, China.
H.T. Kung, F. Luccio, and E.P. Preparata, On Finding the Maxima of a Set of Vectors, Oct. 1975, vol. 22 No. 4 p. 469-476, Journal of the Association for Computing Machinery.

(Continued)

*Primary Examiner* — Jay Morrison
(74) *Attorney, Agent, or Firm* — Ren-Sheng International (57) ABSTRACT

Embodiments of the present disclosure set forth a method for selecting a preferred data set. The method includes generating a candidate data set based on a first data set having a first join attribute, and a first aggregate attribute and a second data set having a second join attribute compatible with the first join attribute, and a second aggregate attribute, wherein the candidate data set includes a total attribute having a value that is based on aggregating a value associated with the first aggregate attribute and a value associated with the second aggregate attribute; and selecting the preferred data set from the candidate data set based on the total attribute.

18 Claims, 6 Drawing Sheets

(56) References Cited

OTHER PUBLICATIONS

Chuang Liu, Lingyun Yang, Ian Foster, and Dave Angulo, Design and Evaluation of a Resource Selection Framework for Grid Applications, 2002, In HPDC-11 p. 63.

Dimitris Papadias, Yufei Tao, Greg Fu, and Bernhard Seeger, An Optimal and Progressive Algorithm for Skyline Queries, 2003, In ACM SIGMOD Jun. 9-12 p. 467-478.

Michael Stonebraker and Joseph M. Hellerstein, Content Integration for E-Business, 2001, In ACM SIGMOD May 21-24, 2001 p. 552-560.

Dalie Sun, Sai Wu, Jianzhong Li, and Anthony K. H. Tung, Skyline-Join in Distributed Databases, 2008, In ICDE workshops p. 176-181.

Hannes Eder, On Extending PostgreSQL with the Skyline Operator, Jan. 2009, Technische Universit at Wien, Karlsplatz.

Hao Yuan and Mikhail J. Atallah, Efficient Data Structures for Range-Aggregate Queries on Trees, Mar. 23-25, 2009, ICDT, Saint Petersburg, Russia.

B. Palvali Teja, "Complex Query Processing in Large Databases", Its my view blog, May 10, 2010.

B. Palvali Teja, "Improving the Efficiency and Extending the Scope of Skyline Operator", Indian Institute of Technology Kanpur, May 2010, pp. 1-75.

B. Palvali Teja et al., "Aggregate Skyline Join Queries: Skylines with Aggregate Operations Over Multiple Relations", VLDB, pp. 10, Sep. 13-17, 2010, Singapore.

\* cited by examiner

300 A computer program product

304 A signal bearing medium 302 at least one of one or more instructions for generating a candidate data set based on a first data set having a first join attribute and a first aggregate attribute, and a second data set having a second join attribute compatible with the first join attribute and a second aggregate attribute, wherein the candidate data set includes a total attribute having a value that is based on aggregating a value associated with the first aggregate attribute and a value associated with the second aggregate attribute; and/or one or more instructions for selecting the preferred data set from the candidate data set based on the total attribute 306 a communication medium 308 a non-transitory computer readable medium 310 a recordable medium

MULTIPLE CRITERIA DECISION ANALYSIS

BACKGROUND OF THE DISCLOSURE

Multiple criteria decision analysis generally refers to an approach of making numerous and sometimes conflicting evaluations among different groups of data sets. A preferable data set may be selected from the groups of data sets based on some preset preferences.

SUMMARY

Some embodiments of the present disclosure may generally relate to methods for selecting a preferred data set. One example method may include generating a candidate data set based on a first data set having a first join attribute, and a first aggregate attribute and a second data set having a second join attribute compatible with the first join attribute, and a second aggregate attribute. The candidate data set may include a total attribute having a value that is based on aggregating a value associated with the first aggregate attribute and a value associated with the second aggregate attribute. The example method may also include selecting the preferred data set from the candidate data set based on the total attribute.

Some additional embodiments of the present disclosure may generally relate to methods for selecting a preferred data set. One example method may include processing a first data set to retain tuples that are not fully dominated. The example method may also include generating a candidate data set based on the first data set having a first join attribute, and a first aggregate attribute and a second data set having a second join attribute compatible with the first join attribute, and a second aggregate attribute. The candidate data set may include a total attribute having a value that is based on aggregating a value associated with the first aggregate attribute and a value associated with the second aggregate attribute. The candidate data set may further include a first local attribute selected from the first data set. The example method may further include selecting the preferred data set from the candidate data set based on the total attribute.

Additional embodiments of the present disclosure may generally relate to computer-readable media containing instructions for selecting a preferred data set. One example computer-readable medium may contain instructions, which when executed by a monitoring device, causes the monitoring device to generate a candidate data set based on a first data set having a first join attribute, and a first aggregate attribute and a second data set having a second join attribute compatible with the first join attribute, and a second aggregate attribute, wherein the candidate data set includes a total attribute having a value that is based on aggregating a value associated with the first aggregate attribute and a value associated with the second aggregate attribute; and select the preferred data set from the candidate data set based on the total attribute.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

This disclosure is drawn, inter alia, to methods, apparatus, computer programs, and systems of selecting a preferred data set.

In this disclosure, the term "skyline computation" generally refers to an approach to address a problem of multi-criteria decision making where there is no clear preference function over the attributes. Instead, such computation attempts to get an overall picture of which objects dominate the other objects based on one or more preset preferences. A "local attribute" is an attribute in a data set on which a preference is applied for a skyline computation, but no aggregation operation with an attribute of another data set is performed. An "aggregate attribute" is an attribute in a data set on which an aggregation operation is performed with another attribute to obtain an aggregated value. Then a preference is generally applied on the aggregated value for the skyline computation. A "join attribute" is an attribute in a data set on which no preferences are specified, but is used to specify the join conditions between two data sets. A "join tuple" is a tuple that includes at least one attribute each from a tuple in a first data set and a second data set. A first tuple "fully dominates" a second tuple if at least one attribute in the first tuple is preferred over the respective attribute in the second tuple, while the rest of the attributes in the first tuple are considered equal to the respective attributes in the second tuple. A first tuple "locally dominates" a second tuple if at least one local attribute in the first tuple is preferred over the respective attribute in the second tuple, while the rest of the local attributes in the first tuple are equal to the respective attributes in the second tuple. A "local candidate tuple" is a tuple not locally dominated by any one of the other tuples in a relation. A "target set" may exist for a data set. A first tuple in the data set can be dominated only by a second tuple in the target set and not by any tuple not in the target set.

In some embodiments, the multiple criteria decision analysis may include a skyline computation. A skyline computation has wide applications. For example, one application involves selecting hotels that are cheap and close to the beach. After the skyline computation, hotels in the computed preferred data set are better than those not in the preferred set because they are superior in at least one attribute, cost or closeness to the beach, while being equivalent in all other attributes. Another example may include selecting a combination of a camera and a memory card in which the total price is the lowest, the image resolution of the camera is the highest, and the capacity of the memory card is the highest.

In some embodiments, a data set may be a relation (or table) in a relational database and the preferred data set may be computed as a result set for a Structured Query Language (SQL) query. In some embodiments, a data set may be a flat file. In some other embodiments, a data set may be a set of tuples in a non-relational database. In yet other embodiments, a data set may be a set of tuples in a semi-structured data store. The example embodiments discussed henceforth are directed towards computing a preferred data set in a relational database system. However, it will be apparent to those of ordinary skill in the art, that the proposed technique may be applied to data sets other than those stored in a relational database system.

Figure 1:
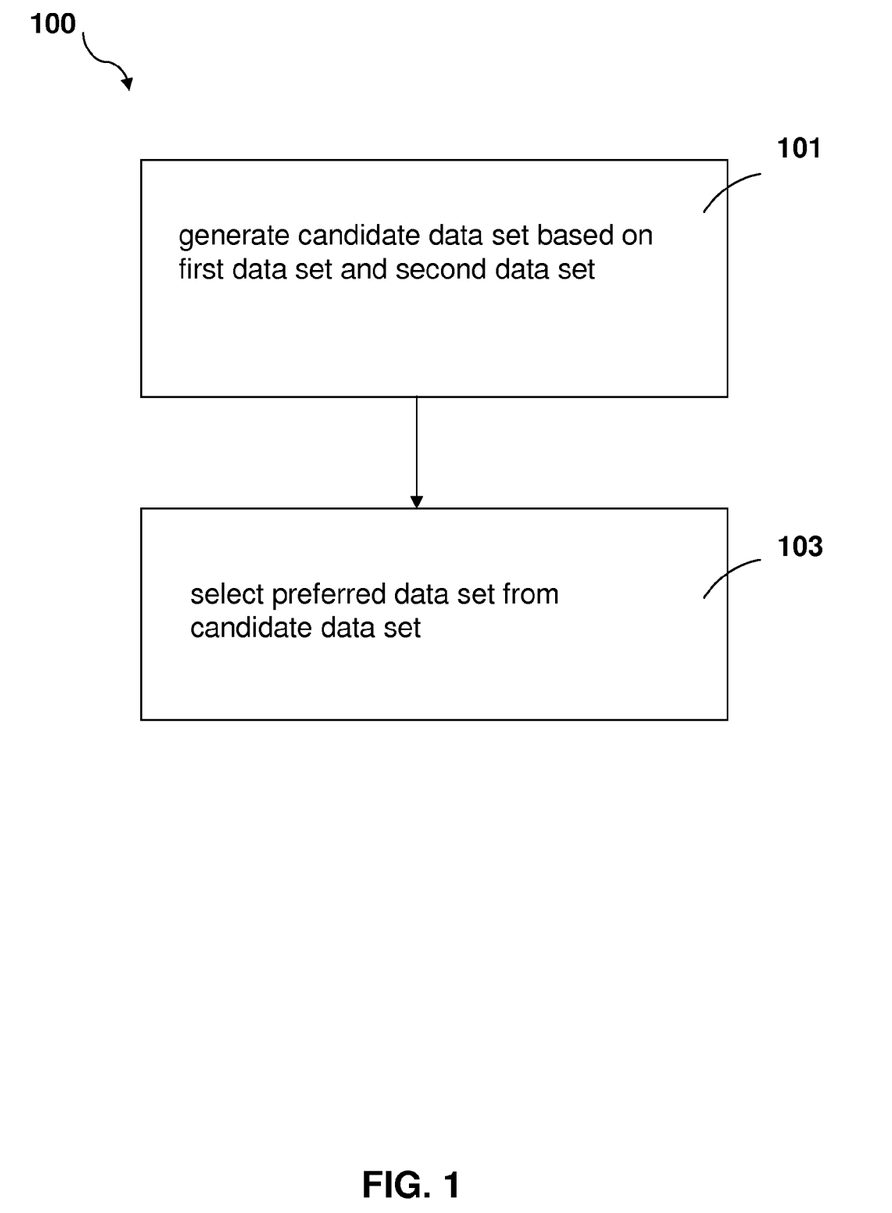
FIG. 1 is a flow chart of an illustrative embodiment of a method for selecting a preferred data set.

FIG. 1 is a flow chart of an illustrative embodiment of a method 100 for selecting a preferred data set associated with the skyline computation. In step 101, the method generates a candidate data set based on a first data set and a second data set. The first data set may be a first relation which includes a first join attribute and a first aggregate attribute. The second data set may be a second relation which includes a second join attribute and a second aggregate attribute. The first join attribute is compatible with the second join attribute and a logical relationship exists between the first join attribute and the second join attribute. Some example logical relationships include equality and inequality. In some other embodiments, the first data set and the second data set may both be part of a single relation in a relational database.

The candidate data set includes a total attribute having a value that is based on aggregating a value associated with the first aggregate attribute and a value associated with the second aggregate attribute. The aggregating is associated with a monotonic function, for example, a sum function, an average function, a minimum function, or a maximum function. The candidate data set may further include a first local attribute selected from the first data set. The method continues in step 103.

In step 103, the method selects a preferred data set from the candidate data set based on the total attribute. In some other embodiments, the method selects the preferred data set from the candidate data set based on the total attribute and the first local attribute.

Using the selection of a preferred travel plan from City A to City B as an example, Table 1 shows flights from City A and Table 2 shows flights to City B. When there is no direct flight from City A to City B, the travel plan includes two separate flights combined from Table 1 and Table 2. In such implementation, the travel plan needs a connection hub for transit. In addition, the arrival time of the first flight to the connection hub is earlier than the departure time of the second flight from the connection hub. At the same time, the travel plan includes the lowest overall cost and duration, and the best rating and amenities for the first flight and the second flight.

TABLE 1

Flights from City A

| fno | Dep | arr | dest | duration | cost | amn | rating |
|-----|-----|-----|------|----------|------|-----|--------|
| 3110 | 17:00 | 20:20 | C | 3 h 20 m | 183 | 4 | 3 |
| 3420 | 09:50 | 10:40 | C | 1 h 40 m | 270 | 3 | 2 |
| 3802 | 06:30 | 08:40 | C | 2 h 10 m | 162 | 5 | 4 |
| 4321 | 12:00 | 13:50 | C | 1 h 50 m | 173 | 4 | 3 |
| 6423 | 16:00 | 17:30 | D | 1 h 30 m | 230 | 3 | 3 |
| 3813 | 07:00 | 09:00 | E | 2 h 00 m | 166 | 4 | 5 |
| 5374 | 08:05 | 10:00 | E | 1 h 55 m | 140 | 3 | 4 |

TABLE 2

Flights to City B

| fno | Src | dep | arr | duration | cost | amn | rating |
|-----|-----|-----|-----|----------|------|-----|--------|
| 3111 | C | 16:00 | 18:49 | 2 h 49 m | 160 | 2 | 3 |
| 3803 | C | 09:50 | 12:00 | 2 h 10 m | 162 | 5 | 4 |
| 4322 | C | 16:00 | 18:45 | 2 h 45 m | 160 | 4 | 4 |
| 3814 | D | 17:00 | 19:00 | 2 h 00 m | 166 | 4 | 5 |
| 6424 | D | 16:00 | 17:49 | 1 h 49 m | 220 | 3 | 4 |
| 3823 | E | 20:00 | 21:46 | 1 h 46 m | 200 | 3 | 3 |
| 5376 | E | 20:00 | 21:30 | 1 h 30 m | 160 | 4 | 3 |

In the embodiments set forth above, the first data set is Table 1 and the second data set is Table 2. The "arr" and "dest" of Table 1 are join attributes of the first data set. The "src" and "dep" of Table 2 are join attributes of the second data set. The "cost" and "duration" of Table 1 are aggregate attributes of the first data set. The "cost" and "duration" of Table 2 are aggregate attributes of the second data set. The sum of the "cost" of Table 1 and the "cost" of Table 2 is a total attribute. The sum of the "duration" of Table 1 and the "duration" of Table 2 is another total attribute. The local attribute includes "amn" and "rating" of Table 1 and "amn" and "rating" of Table 2. To select the preferred travel plan, it includes joining Table 1 and Table 2 based on the join attributes, and generating a total attribute by aggregating the aggregate attributes of Table 1 and Table 2. Table 3 shows a part of the joined results.

TABLE 3

Part of the joined results

| f1.fno | f2.fno | f1.dest | f1.arr | f2.dep | f1.amn | f2.amn | f1.rating | f2.rating | cost | duration |
|--------|--------|---------|--------|--------|--------|--------|-----------|-----------|------|----------|
| 3802 | 3803 | C | 08:40 | 09:50 | 5 | 5 | 4 | 4 | 324 | 4 h 20 m |
| 3802 | 4322 | C | 08:40 | 16:00 | 5 | 4 | 4 | 4 | 322 | 4 h 55 m |
| 4321 | 4322 | C | 13:50 | 16:00 | 4 | 4 | 3 | 4 | 333 | 4 h 35 m |
| 3420 | 4322 | C | 10:40 | 16:00 | 3 | 4 | 2 | 4 | 430 | 4 h 25 m |
| 3813 | 5376 | E | 09:00 | 20:00 | 4 | 4 | 5 | 3 | 326 | 3 h 30 m |
| 5374 | 5376 | E | 10:00 | 20:00 | 3 | 4 | 4 | 3 | 300 | 3 h 25 m |

Then, the preferred travel plan is selected from the candidate data set through the skyline calculations. As set forth above, the preferred travel plan includes the lowest total cost and duration, and the best rating and amenities for the first flight and the second flight.

In some embodiments, the preferred travel plan selection may be represented by a query written using the SQL, as shown below:
select f1.fno, f2.fno, f1.dest, f1.arr, f2.dep, f1.rating,
    f2.rating, f1.amn, f2.amn,
    cost as f1.cost+f2.cost,
    duration as f1.duration+f2.duration
from FlightsA f1, FlightsB f2
where f1.dest=f2.src and f2.arr<f2.dep and
    skyline of cost min, duration min, f1.rating max, f2.rating max, f1.amn max, f2.amn max In some other embodiments, selecting a preferred data set from Table 1 may include identifying and excluding a first fully dominated tuple in Table 1. The first fully dominated tuple is fully dominated by at least one other tuple in Table 1. Because the fully dominated tuples are fully dominated by at least one other tuple, the fully dominated tuples are not a part of the candidate data set.

For example, in Table 1, the tuples of flights 3110, 3420, 3802, and 4321 have one common join attribute (i.e., the same destination C). Among the four tuples, the tuple of flight 3110 is fully dominated by the tuple of flight 3802, because the tuple of flight 3110 has a longer duration, a higher cost, less amenities, and a lower rating than the tuple of flight 3802.

In Table 1, the tuple of flight 6423 is not fully dominated by any other tuples because the tuple of flight 6423 has a unique join attribute (i.e., destination D). The tuples of flights 3813 and 5374 have a common join attribute (i.e., the same destination E). However, neither of them is fully dominated by the other, because not all attributes of the tuple of flight 3813 are preferred over or equal to the respective attributes of the tuple of flight 5374 (e.g., the tuple of flight 5374 has a shorter duration and less amenity and rating than the tuple of flight 3813).

Following the similar approaches set forth above for determining whether a tuple is full dominated, in Table 2, the tuples of flight 3111 and 3823 are fully dominated tuples.

In some embodiments, generating a candidate data set (e.g., Table 3) based on Table 1 and Table 2 further includes selecting a first local candidate tuple and a second local candidate tuple in Table 1 and Table 2, respectively. Because the local candidate tuples at least dominate other tuples in the same data set by one local attribute, a join tuple that includes either the first local candidate tuple or the second local candidate tuple is a part of the candidate data set.

For example, the tuple of flight 3802 is a local candidate tuple, because it has the best amenities (i.e., 5) among the flights in Table 1. Similarly, the tuple of flight 3813 is also a local candidate tuple, because it has the highest rating (i.e., 5) among the flights in Table 2.

Similarly, flights 3803 and 3814 are also local candidate tuples in Table 2 because each of them has at least one local attribute that dominates the other tuples in the same relation.

Though a join tuple that includes either a first local candidate tuple or a second local candidate tuple is a part of the candidate data set, the candidate data set may also include a join tuple that includes both a first local non-candidate tuple from Table 1 and a second local non-candidate tuple from Table 2.

In some other embodiments for selecting preferred data set, a preferred data set is selected based on the aggregate attribute and the local attribute. A candidate data set may include a first set of tuples formed by joining two local candidate tuples. It may further include a second set of tuples formed by joining a local candidate tuple from one table and a tuple that is not a local candidate from the other table. It may further include a third set of tuples containing some tuples formed by joining tuples that are not a local candidate in the first and second table.

In some embodiments set forth above, the selection of the preferred data set may include comparing a tuple in the third set of tuples against all tuples of the first set of tuples and the second set of tuples. However, the tuple in the third set of tuples can be only dominated by certain tuples of the first set of tuples and the second set of tuples. Identifying these certain tuples avoids comparing the tuple in the third set of tuples against all tuples of the first set of tuples and the second set of tuples.

In some embodiments, identifying the certain tuples discussed above may include identifying a dominance relationship between the first or the second sets of tuples and the third set of tuples.

For example, based on the join attributes, the first set of tuples include a combination of flights 3802 and 3803, the second set of tuples include a combination of flights 3802 and 4322 and a combination of flights 3813 and 5376, and the third set of tuples include a combination of flights 4321 and 4322, a combination of flights 5374 and 5376, and a combination of flights 3420 and 4322. In the embodiments set forth above, it requires 9 comparisons for the third set of tuples to determine whether any tuple from the third set is in the preferred data set. However, in the embodiments discussed here, the number of comparisons is decreased.

In Table 1, flights 3802 and 3813 have been identified as the local candidate tuples, and flights 4321, 5374, 3420, and 6423 are local non-candidate tuples. Two dominance relationships may be identified. A first dominance relationship may refer to flight 3802 locally dominating flights 4321, 5374, 3420, and 6423. A second dominance relationship may refer to flight 3813 locally dominating flights 4321, 5374, 4320, and 6423. Therefore, flights 3802 and 3813 are local dominators for flights 4321, 5374, 3420, and 6423.

In Table 2, flights 3803 and 3814 have been identified as the local candidate tuples, and flights 4322, 5376, and 6424 are local non-candidate tuples. Another two dominance relationships, such as a third dominance relationship and a fourth dominance relationship, may be identified. The third dominance relationship may refer to flight 3803 locally dominating flights 4322, 5376, and 6424. The fourth dominance relationship may refer to flight 3814 locally dominating flights 4322, 5376, and 6424. Therefore, flights 3803 and 3814 are local dominators for flights 4322, 5376, and 6424.

An example tuple (4321, 4322) from the third set can only be dominated by tuples formed by joining a first local dominator that locally dominates flight 4321 and a second local dominator that locally dominates flight 4322. For example, the tuple (3802, 3803) from the first set of tuples dominates the example tuple (4321, 4322). As a result, instead of the 9 comparisons in the embodiments set forth above, the embodiments here involves 3 comparisons for the third set of tuples to determine whether one of them is the preferred data set.

The local dominator computations may be computation intensive operations. Some other embodiments eliminate or reduce such costly computations.

In the previous embodiments of computing local dominators, these approaches involve identifying a first stage set of local candidate tuples (e.g., flights 3802 and 3813) and a first stage set of local non-candidate tuples (e.g., flights 4321, 5374, 3420, and 6423). In some other embodiments, the first stage set of local non-candidate tuples are further divided into a second stage set of local candidate tuples and a second stage set of local non-candidate tuples based on the local attributes. The dividing process may be iterated until the cardinality of the last stage set of local non-candidate tuples is less than a threshold.

Using the flights shown in Tables 1, 2, and 3 as an example, in Tables 4 and 5, the first stage set of local candidate tuples are $A_1$ and $B_1$. The first stage set of local non-candidate tuples are $A_1'$ and $B_1'$.

TABLE 4

Categorization of flights in Table 1

| Set | | | Flight Numbers |
|---|---|---|---|
| $A_0$ | $A_1$ | | 3802, 3813 |
| | $A_1'$ | $A_2$ | 4321, 5374 |
| | | $A_2'$ | 3420, 6423 |
| $A_0'$ | | | 3110 |

TABLE 5

Categorization of flights in Table 2

| Set | | | Flight Numbers |
|---|---|---|---|
| $B_0$ | $B_1$ | | 3803, 3814 |
| | $B_1'$ | $B_2$ | 4322 |
| | | $B_2'$ | 5376, 6424 |
| $B_0'$ | | | 3111, 3823 |

Four flight tuples (i.e., 4321, 5374, 3420, and 6423) in the first stage set of non-local candidate tuples are further subdivided into second stage set of local candidate tuples (i.e., $A_2$) and second stage set of non-local candidate tuples (i.e., $A_2'$). As shown in Table 4, Flight 3420 is locally dominated by flight 4321. Flight 6423 is locally dominated by flights 5374 and 4321. Flight 4321, however, is not locally dominated by any of the other three flights, namely, 5374, 3420 and 6423. Thus, flights 4321 and 5374 are in the second stage set of local candidate tuples. Flights 3420 and 6423 are in the second stage set of non-local candidate tuples. Similarly, flight 4322 is another second stage local candidate tuple. Flights 5376 and 6424 are another two second stage non-local candidate tuples.

The subdividing may be iterated until local candidate tuples cannot be found or while the cardinality of the last stage non-local candidate tuple is less than a preset threshold. Here, $A_2'$ and $B_2'$ are not further subdivided, because both of these sets have two tuples, and no tuple locally dominates the other. In other words, $A_3=A_2'$ and $B_3=B_2'$, and $A_3'$ and $B_3'$ are empty. This is considered as the last iteration.

As set forth, dominance relationships exist among sets of tuples obtained at each iteration. Therefore, for each set ($A_i$, $B_j$), it only needs to be compared with certain target sets to determine whether the set ($A_i$, $B_j$) is the preferred data set. For example, a tuple in ($A_2$, $B_2$) is compared with tuples in ($A_1$, $B_1$), and unnecessary comparisons with tuples in ($A_1$, $B_1'$), ($A_1'$, $B_1$) or ($A_1'$, $B_1'$) are as a result eliminated.

Figure 2A:
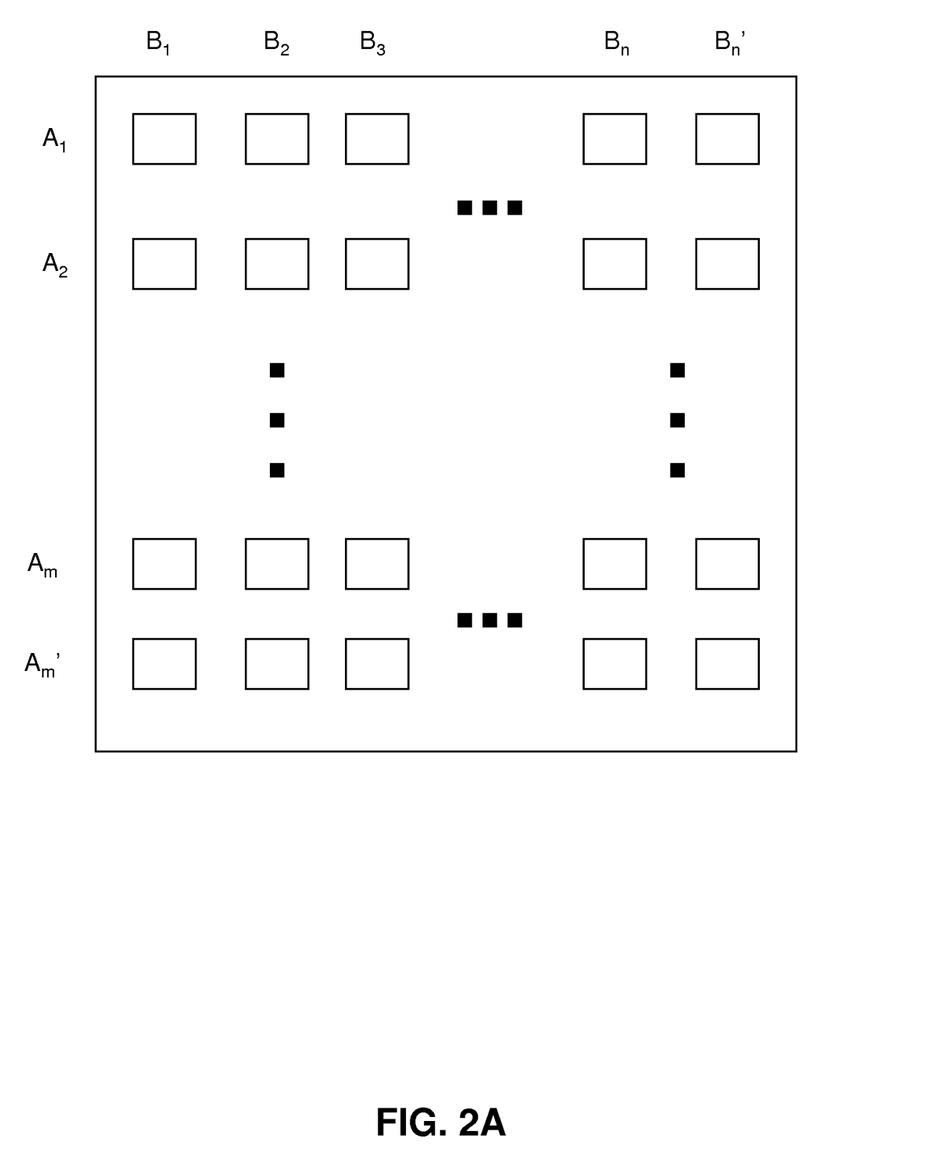
FIG. 2A shows a scheme of an illustrative embodiment of a categorization of a first data set and a second data set.
Figure 2B:
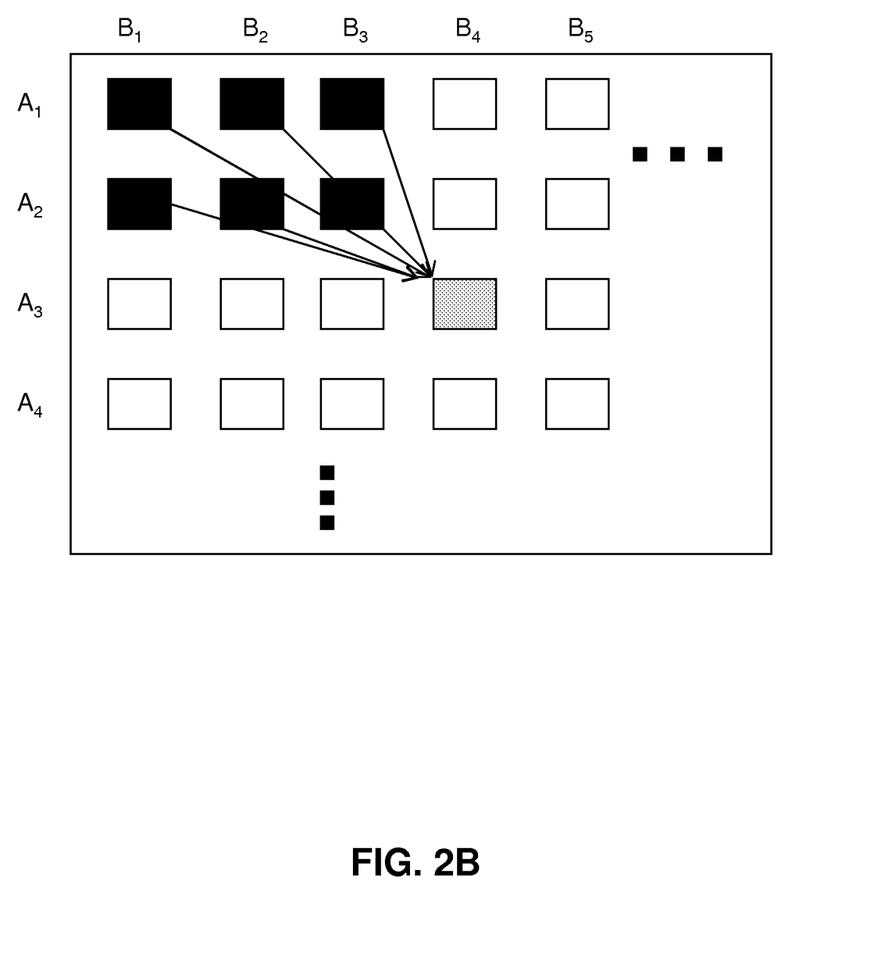
FIG. 2B shows a scheme of an illustrative embodiment illustrating a dominance relationship between a data set and a specific group of data set.
Figure 2C:
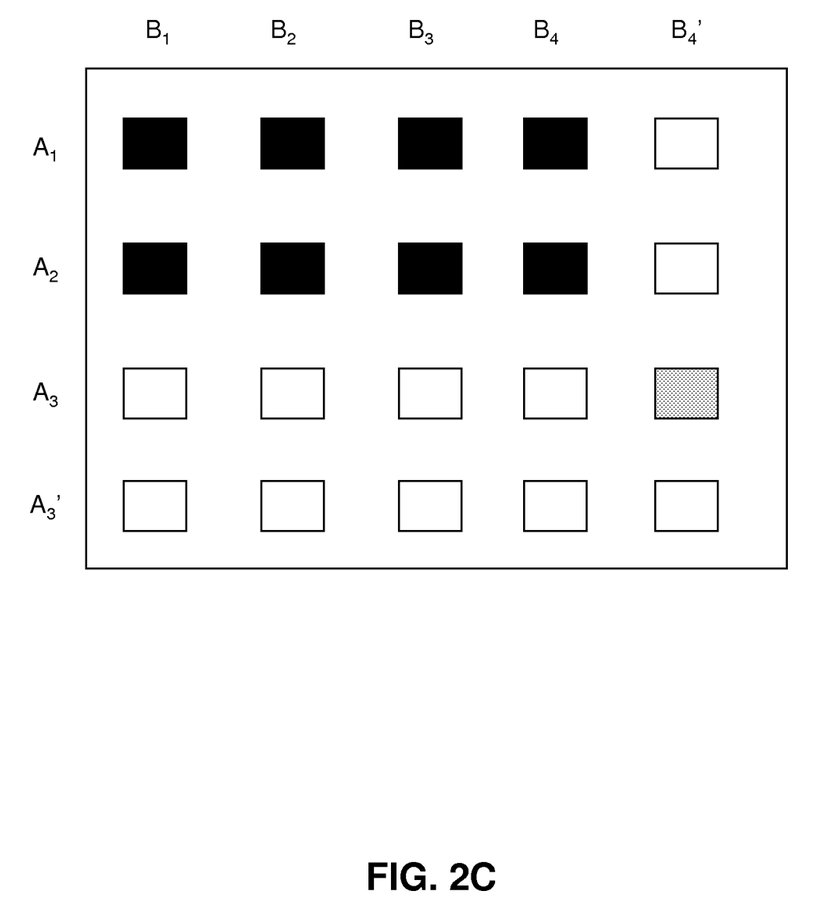
FIG. 2C shows a scheme of an illustrative embodiment illustrating a dominance relationship between a data set and a specific group of data set.

FIGS. 2A, 2B, and 2C illustrate the construction of example target sets. The first data set (e.g., Table 1) is categorized into m stages set of local candidate data tuples. The second data set (e.g., Table 2) is categorized into n stages set of local candidate data tuples. FIG. 2A shows the complete data set of the first data set and the second data set. Each block corresponds to a candidate data set. A block (e.g., ($A_i$, $B_j$), where i=1 to m, and j=1 to n) may initially include both local candidate tuples and local non-candidate tuples. As the iterative algorithm progresses, such block may include only local candidate tuples including the same stage local candidate tuples or the different stages local candidate tuples.

The dominators of a record in set $A_i$ obtained in an iteration lie only in sets that are obtained in iterations before it, i.e., $A_1$, $A_2$, ..., $A_{i-1}$. Therefore, dominators of candidate data set in $A_i \times B_j$ lie in a data set of $A_k \times B_l$, where k=1, 2 ... i-1, and l=1, 2 ... j-1. This is shown in FIG. 2B. The grey block includes the candidate data set under consideration and the black block includes the set of tuples that the grey block is compared with to identify tuples that are a part of the preferred data set.

Similarly, the sets ($A_m'$, $B_j$) has to be compared with sets ($A_k$, $B_l$) where k is 1, 2, ... m, and l is 1, 2, ... j-1. The sets ($A_m$, $B_j'$) had to be compared with sets ($A_o$, $B_p$) where o is 1, 2, ... m-1, and p is 1, 2, ... j, as illustrated in FIG. 2C.

Figure 3:
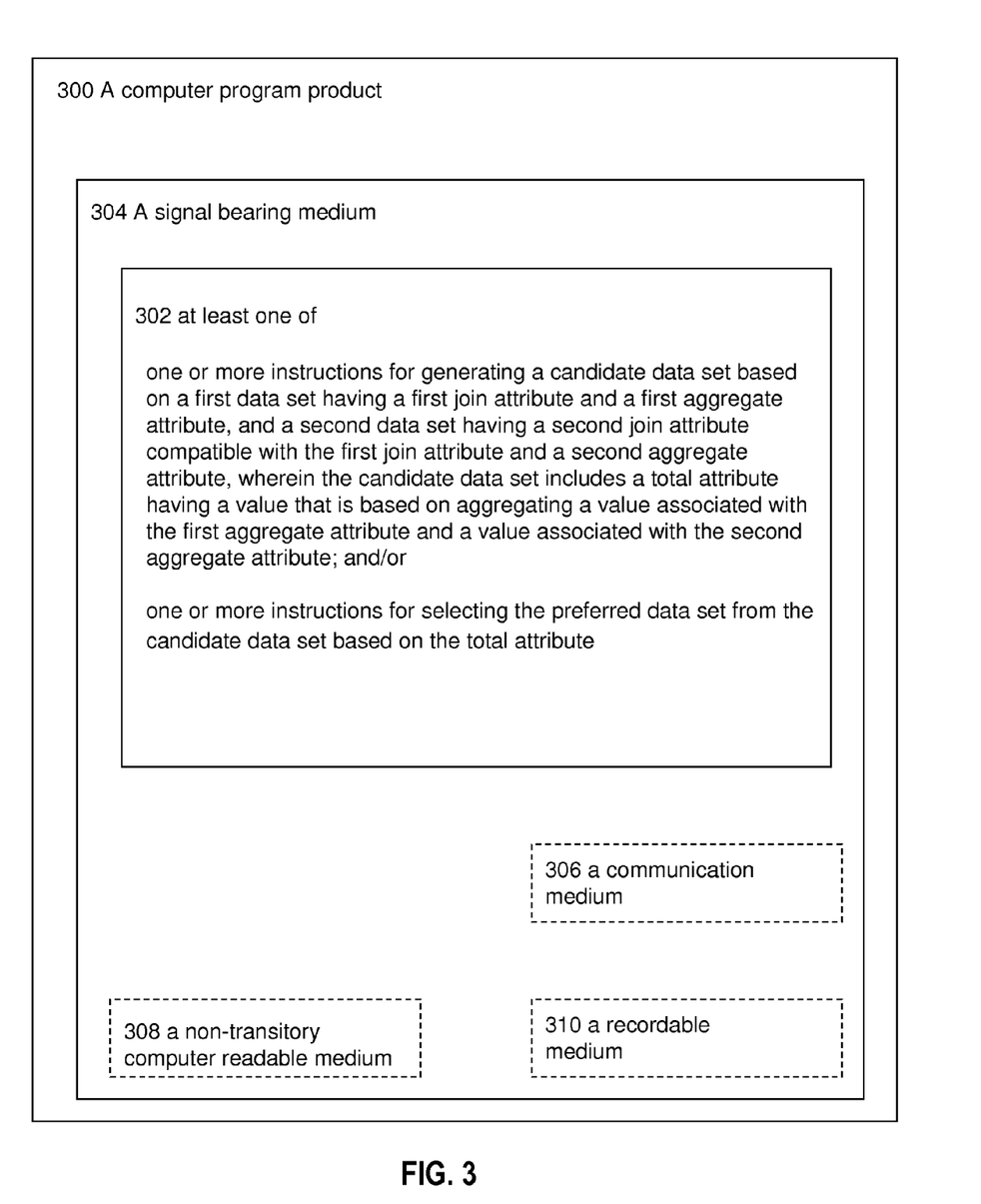
FIG. 3 shows a block diagram of an illustrative embodiment illustrating a computer program product that is arranged for selecting a preferred data set.

FIG. 3 shows a block diagram illustrating a computer program product that is arranged for selecting a preferred data set. The computer program product 300 may include a signal bearing medium 304, which may include one or more sets of executable instructions 302 that, when executed by, for example, a processor of a computing device, may provide at least the functionality described above and illustrated in FIG. 1.

In some implementations, the signal bearing medium 304 may encompass a non-transitory computer readable medium 308, such as, but not limited to, a hard disk drive, a Compact Disc (CD), a Digital Versatile Disk (DVD), a digital tape, memory, etc. In some implementations, the signal bearing medium 304 may encompass a recordable medium 310, such as, but not limited to, memory, read/write (R/W) CDs, R/W DVDs, etc. In some implementations, the signal bearing medium 304 may encompass a communications medium 306, such as, but not limited to, a digital and/or an analog communication medium (e.g., a fiber optic cable, a waveguide, a wired communications link, a wireless communication link, etc.) The computer program product 300 may also be recorded in the non-transitory computer readable medium 308 or another similar recordable medium 310.

Figure 4:
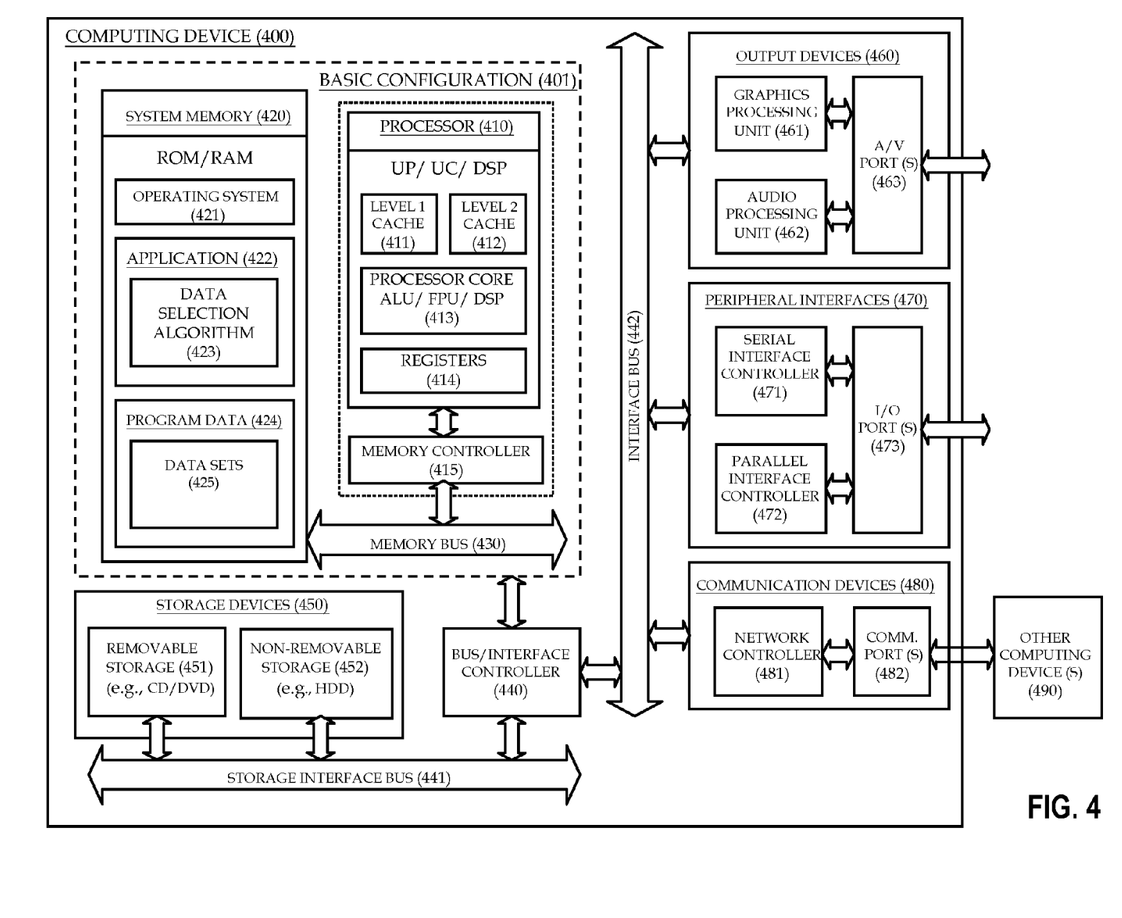
FIG. 4 shows a block diagram of an illustrative embodiment of a computing device that is arranged for selecting a preferred data set.

FIG. 4 shows a block diagram of an illustrative embodiment of a computing device that is arranged for selecting a preferred data set. In a very basic configuration 401, computing device 400 typically includes one or more processors 410 and a system memory 420. A memory bus 430 may be used for communicating between processor 410 and system memory 420.

Depending on the desired configuration, processor 410 may be of any type including but not limited to a microprocessor (μP), a microcontroller (μC), a digital signal processor (DSP), or any combination thereof. Processor 410 may include one more levels of caching, such as a level one cache 411 and a level two cache 412, a processor core 413, and registers 414. An example processor core 413 may include an arithmetic logic unit (ALU), a floating point unit (FPU), a digital signal processing core (DSP Core), or any combination thereof. An example memory controller 415 may also be used with processor 410, or in some implementations memory controller 415 may be an internal part of processor 410.

Depending on the desired configuration, system memory 420 may be of any type including but not limited to volatile memory (such as RAM), non-volatile memory (such as ROM, flash memory, etc.) or any combination thereof. System memory 420 may include an operating system 421, one or more applications 422, and program data 424. In some embodiments, application 422 may include a data selection algorithm 423 that is arranged to perform the functions as described herein including those described with respect to the steps 101 and 103 of the method 100 of FIG. 1. Program data 424 may include data sets 425 that may be useful for the operation of data selection algorithm 423 as will be further described below. In some embodiments, the data sets 425 may include, without limitation, the first data set and the second data set of block 101 of FIG. 1. In some embodiments, application 422 may be arranged to operate with program data 424 on operating system 421 such that implementations of selecting preferred data set may be provided as described herein. This described basic configuration 401 is illustrated in FIG. 4 by those components within the inner dashed line.

In some other embodiments, application 422 may include data selection algorithm 423 that is arranged to perform the functions as described herein including those described with respect to the steps 101 and 103 of the method 100 of FIG. 1.

Computing device 400 may have additional features or functionality, and additional interfaces to facilitate communications between basic configuration 401 and any required devices and interfaces. For example, a bus/interface controller 440 may be used to facilitate communications between basic configuration 401 and one or more data storage devices 450 via a storage interface bus 441. Data storage devices 450 may be removable storage devices 451, non-removable storage devices 452, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 420, removable storage devices 451 and non-removable storage devices 452 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 442 for facilitating communication from various interface devices (e.g., output devices 460, peripheral interfaces 470, and communication devices 480) to basic configuration 401 via bus/interface controller 440. Example output devices 460 include a graphics processing unit 461 and an audio processing unit 462, which may be configured to communicate to various external devices such as a display or speakers via one or more A/V ports 463. Example peripheral interfaces 470 include a serial interface controller 471 or a parallel interface controller 472, which may be configured to communicate with external devices such as input devices (e.g., keyboard, mouse, pen, voice input device, touch input device, etc.) or other peripheral devices (e.g., printer, scanner, etc.) via one or more I/O ports 473. An example communication device 480 includes a network controller 481, which may be arranged to facilitate communications with one or more other computing devices 490 over a network communication link via one or more communication ports 482. In some embodiments, the other computing devices 490 may include other applications, which may be operated based on the results of the application 422.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost versus efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method for selecting a preferred data set, comprising:
generating, by one or more processors, a candidate data set based on a first data set having a first join attribute, a first aggregate attribute and a first local attribute, and a second data set having a second join attribute compatible with the first join attribute and a second aggregate attribute, wherein the candidate data set includes a total attribute having a value that is based on aggregating a value associated with the first aggregate attribute and a value associated with the second aggregate attribute, and the candidate data set further includes the first local attribute selected from the first data set; and selecting, by one or more processors, the preferred data set from the candidate data set based on the total attribute and the first local attribute, wherein no tuple in the preferred data set is fully dominated by any other tuples in the preferred data set.

2. The method of claim 1, wherein the aggregating is associated with a monotonic function including one or more of a sum function, an average function, a minimum function, and a maximum function.

3. The method of claim 1, wherein the first join attribute and the second join attribute have a logical relationship.

4. The method of claim 3, wherein the logical relationship includes one of equal to, less than, less than or equal to, greater than, and greater than or equal to.

5. The method of claim 1, before the generating, further comprising processing the first data set to retain tuples which are not fully dominated.

6. The method of claim 5, before the generating, further comprising selecting a first tuple from the first data set that locally dominates a second tuple based on a third local attribute in the first data set.

7. The method of claim 6, wherein the candidate data set includes the first tuple.

8. The method of claim 6, wherein the candidate data set includes the second tuple.

9. The method of claim 6, after the selecting the first tuple, further comprising finding a dominance relationship among the first tuple and other tuples based on the third local attribute in the first data set.

10. The method of claim 9, wherein the selecting the preferred data set from the candidate data set is also based on the dominance relationship.

11. The method of claim 6, further comprising selecting a third tuple from the first data set that is locally dominated by the second tuple based on a fourth local attribute in the first data set.

12. A method for selecting a preferred data set, comprising:
processing, by one or more processors, a first data set to retain tuples which are not fully dominated;
generating, by one or more processors, a candidate data set based on the first data set having a first join attribute and a first aggregate attribute, and a second data set having a second join attribute compatible with the first join attribute and a second aggregate attribute, wherein the candidate data set includes a total attribute having a value that is based on aggregating a value associated with the first aggregate attribute and a value associated with the second aggregate attribute, and the candidate data set further includes a first local attribute selected from the first data set; and after the processing, selecting, by one or more processors, the preferred data set from the candidate data set based on the total attribute, wherein no tuple in the preferred data set is fully dominated by any other tuples in the preferred data set.

13. The method of claim 12, before the generating, further comprising selecting a first tuple from the first data set that locally dominates a second tuple based on a third local attribute in the first data set.

14. The method of claim 13, wherein the candidate data set includes the first tuple.

15. The method of claim 13, wherein the candidate data set includes the second tuple.

16. A non-transitory computer-readable storage medium encoded with computer-executable instructions for selecting a preferred data set, which when executed by a computing device, causes the computing device to:
generate a candidate data set based on a first data set having a first join attribute, a first aggregate attribute and a first local attribute, and a second data set having a second join attribute compatible with the first join attribute and a second aggregate attribute, wherein the candidate data set includes a total attribute having a value that is based on aggregating a value associated with the first aggregate attribute and a value associated with the second aggregate attribute and the first local attribute selected from the first data set; and
select the preferred data set from the candidate data set based on the total attribute and the first local attribute, wherein no tuple in the preferred data set is fully dominated by any other tuples in the preferred data set.

17. The non-transitory computer-readable storage medium of claim 16, further containing additional instructions, which when executed by the computing device, causes the computing device to, before generating the candidate data set, process the first data set to retain tuples which are not fully dominated.

18. The non-transitory computer-readable storage medium of claim 17, further containing additional instructions, which when executed by the computing device, causes the computing device to, before generating the candidate data set, select a first tuple from the first data set that locally dominates a second tuple based on a third local attribute in the first data set.

* * * * *

UNITED STATES PATENT AND TRADEMARK OFFICE
CERTIFICATE OF CORRECTION

PATENT NO. : 8,504,581 B2
APPLICATION NO. : 13/072916
DATED : August 6, 2013
INVENTOR(S) : Bhattacharya et al.

It is certified that error appears in the above-identified patent and that said Letters Patent is hereby corrected as shown below:

On the Title Page, Item (75), under "Inventors", delete "Teja B," and insert -- Teja B., --, therefor.

On the Title Page, Item (56), under "OTHER PUBLICATIONS", in Column 2, Line 11, delete "31 st" and insert -- 31st --, therefor.

On Title Page 2, Item (56), under "OTHER PUBLICATIONS", in Column 2, Line 2, delete "Universit" and insert -- Universität --, therefor.

In the Drawings

In Fig. 4, Sheet 6 of 6, below "PROCESSOR (410)", in Line 1, delete "UP/UC/" and insert -- μP/μC/ --, therefor.

In the Specifications

In Column 5, Line 16, delete "max" and insert -- max. --, therefor.

In Column 11, Line 1, delete "and or" and insert -- and/or --, therefor.

Signed and Sealed this
Thirteenth Day of May, 2014

Michelle K. Lee
*Deputy Director of the United States Patent and Trademark Office*